(12) United States Patent
Lott (10) Patent No.: US 8,948,183 B2
(45) Date of Patent: *Feb. 3, 2015

(54) ENTERPRISE COLLECTION BUS

(71) Applicant: AT&T Mobility II LLC, Atlanta, GA (US)

(72) Inventor: Robert Wayne Lott, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,591

(22) Filed: Jul. 1, 2013

(65) Prior Publication Data

US 2013/0286947 A1    Oct. 31, 2013

Related U.S. Application Data (63) Continuation of application No. 12/033,053, filed on Feb. 19, 2008, now Pat. No. 8,477,781.

(51) Int. Cl.
*H04L 12/28* (2006.01)
*H04L 12/741* (2013.01)
*H04L 12/66* (2006.01)

(52) U.S. Cl.
CPC ............ *H04L 45/74* (2013.01); *H04L 12/66* (2013.01)
USPC ... 370/392; 370/396; 370/395.31; 370/395.5; 370/401; 370/474

(58) Field of Classification Search
USPC ............. 370/390, 392, 395.1, 396, 395.31, 370/395.43, 395.5, 401, 474
See application file for complete search history.

(56) References Cited

U.S. PATENT DOCUMENTS

| | | | |
|---|---|---|---|
| 6,078,891 | A | 6/2000 | Riordan et al. |
| 6,812,857 | B1 | 11/2004 | Kassab et al. |
| 7,058,710 | B2 | 6/2006 | McCall et al. |
| 2001/0047333 | A1 | 11/2001 | Kim et al. |
| 2006/0239427 | A1 | 10/2006 | Cooke et al. |
| 2007/0104190 | A1 | 5/2007 | Harmjanz et al. |
| 2007/0121497 | A1 | 5/2007 | Gibson Ang et al. |
| 2008/0010370 | A1 | 1/2008 | Peake et al. |
| 2009/0080445 | A1 | 3/2009 | Kolakeri et al. |

OTHER PUBLICATIONS

U.S. Office Action dated May 27, 2010 in U.S. Appl. No. 12/033,053.
U.S. Office Action dated Nov. 10, 2010 in U.S. Appl. No. 12/033,053.
U.S. Office Action dated Feb. 28, 2011 in U.S. Appl. No. 12/033,053.

(Continued)

*Primary Examiner* — Alvin Zhu
(74) *Attorney, Agent, or Firm* — Hartman & Citrin LLC (57) ABSTRACT

Systems and methods are presented to collect raw data from a plurality of servers and nodes on a network. A Distributed Enterprise Collection Bus (DECB) architecture is employed at various points on a network. The DECB comprises a collector unit that is protocol agnostic, an orchestration unit, a rule database, a filtering unit, and a distribution unit. Packets of raw data such as Call Detail Records (CDRs) generated by switching centers are received, and distributed to relevant destinations. Relevant destinations include data warehouses, mediation, analytics, etc. The goal is to alleviate collection and filtration duties of the source and destination.

20 Claims, 4 Drawing Sheets

(56) References Cited

OTHER PUBLICATIONS

U.S. Office Action dated Jul. 19, 2011 in U.S. Appl. No. 12/033,053.
U.S. Office Action dated Nov. 9, 2011 in U.S. Appl. No. 12/033,053.
U.S. Office Action dated Mar. 23, 2012 in U.S. Appl. No. 12/033,053.
U.S. Office Action dated Oct. 2, 2012 in U.S. Appl. No. 12/033,053.
U.S. Notice of Allowance dated Feb. 25, 2013 in U.S. Appl. No. 12/033,053.

ENTERPRISE COLLECTION BUS

RELATED APPLICATIONS

This application is a continuation of U.S. patent application Ser. No. 12/033,053, entitled "Enterprise Collection Bus," filed Feb. 19, 2008, now U.S. Pat. No. 8,477,781, which is incorporated herein by reference in its entirety.

BACKGROUND

1. Field of the Invention

The present invention relates generally to communications networks. More particularly, the present invention relates to efficiently collecting large amounts of raw data over a communications network.

2. Background of the Invention

Service providers and network operators are becoming more competitive and offering increasingly diverse services. At the same time, subscribers to these services (personal and business) are demanding more niche services that they can exploit on their high-end wireless and broadband devices. There is increasing pressure on service providers to offer quality services tuned to the subscribers' needs. This involves monitoring a subscriber's use of a service or an application, as well as monitoring other real-time and event-related data.

Data monitored typically includes various packets of raw data generated at several points within and outside the network. This includes records related to usage of services and applications. This also includes real-time information. These records are generated by a number of network nodes deployed across a large region such as a nationwide telecommunications network, including various locations, data centers, regional distribution centers, and Mobile Switching Centers (MSCs). An example of such raw data is a Call Detail Record (CDR), generated by a switching center or MSC when a user makes a telephone call. Similar records are generated when a user accesses a particular service or applications. With today's IP-based networks, actions of a user can be tracked to provide quality personalized service and to increase the operator's revenue. Furthermore, compliance with recent federal wiretap laws mandates an efficient and comprehensive database of calls made and services accessed.

The general idea is to collect and aggregate all the data and store it in what is called a data warehouse. At a high level, charging systems collect a lot of data, take this raw data and correlate it to the services used, and then process the correlated information. For instance, a mediation unit within a billing system is a collection point for raw data. Mediation uses data like billing records, charging records, and Call Data Records (CDRs), and correlates the data according to charging rules. Then the data packets (wrappers) are sent downstream to a billing system to correlate and rate those records with the subscriber's profile. There exists a plethora of similar uses for raw data. Packets of raw data from various sources can be sent to a data warehouse, or specialized data marts for purposes of service solution analytics, device identification analytics (using CDRs), network usage analytics, etc. Rich Internet Protocol (IP) services have advertising layers requiring historical information combined with real-time information about the subscriber to provide such services.

The present system, however, is inefficient when dealing with the increasing quantity of information generated every day. Presently, each application typically has its own sorting and filtering mechanism and a warehouse or data mart for storing the data. These nodes have the duty of sorting the packets and sending the packets to the correct data warehouse. Alternatively, the nodes could each send data to all of the warehouses where the warehouses sort the wrappers to place them in desired locations. What exists today involves a collection interface, a transformation layer that converts incoming data into a usable format (such as an FTP file that has historical HTTP information that needs to be transformed to raw HTTP), and a data sifting layer to determine what information is usable and what is not. After this, information is correlated to something meaningful.

This creates inefficiencies at both the nodal and warehouse levels. A specific CDR may be useful to more than one application or warehouse. However, a network switch programmed to deliver this CDR to multiple destinations has the problem of formatting the CDR to match the requirements of each destination node, and delivering that CDR to the node. Network nodes traditionally use their processing on their interfaces, so even having the ability to send CDRs to multiple places is processor intensive. A provider of an external application or a warehouse operator has to burden the network operators to see if they can deliver multiple call records in parallel. The network operators don't want to be responsible for running up the number of interfaces that they are sending to because of their limited capability.

What is needed is the ability to collect a lot of information from several network sources or web portal sources, and to stream that information to a collector. The collector should be able to orchestrate the information, dismiss duplicate packets, and send the information to multiple data warehouses or destinations.

SUMMARY OF THE INVENTION

The present invention alleviates inefficiency and overload problems with data collection and orchestration by separating the collection, orchestration, and delivery from the actual destination. Where typically the vendor would combine all this and use it for one application, the present invention separates these functions to use for multiple sources and destinations. The invention works with a communications network that stores a large volume of wrappers or packets of data into one of several data warehouses. These packets of data include raw data, which includes information concerning customers, mediation (billing), CDRs, ACRs, and other event and usage-related records. The invention acts as a pre-warehousing system whereby packets of raw data are first sent to a Distributed Enterprise Collection Bus (DECB) where the wrappers are collected, filtered, sorted, and sent to the appropriate data warehouse. The process relieves the duty, and processing speed, from the network nodes that currently have to sort them. The filtration process rids the warehouse of useless information creating a more effective database. Where in the past all network nodes sent records directly to mediation or warehousing, the present invention introduces a middle layer having the ability to aggregate network sources in a distributed or centralized architecture, and send all information to one collection point. Thus, in one exemplary embodiment, the present invention can be considered a pass-through device having an orchestration engine that determines where information is sent. The goal is to alleviate network nodes and resources for mediation to perform its intended function.

In another exemplary embodiment, the present invention is a network system for collecting information. The system includes a collecting unit, an orchestration unit, a database, a filtering unit, and a distribution unit. Together, these elements form an Enterprise Collection Bus (ECB). The collecting unit is protocol agnostic, thus the ECB can be placed at any point in the network where maximum raw information can be collected. Thus the present invention relieves from the network nodes the duty of sorting and/or sending the data to multiple locations. A node, which has many other duties besides sorting, can send its raw data to a single enterprise collection bus, which then sorts and filters the packets before sending them to the appropriate destination.

In a further exemplary embodiment, the present invention is a method for collecting information on a network by receiving a packet of raw data that is generated by a source server on the network, consulting a rule database to determine an appropriate destination address for the packet, and delivering the packet to one or more appropriate destination addresses. Packets of raw data that do not have an appropriate destination address are discarded. Thus, the present invention not only sorts the incoming wrappers and relieves the nodes of that burden, but also filters the wrappers to create a more effective database. This allows the nodes to focus on their other duties and maintain higher efficiency.

In yet another embodiment, the present invention is a Distributed Enterprise Collection Bus architecture that includes two or more ECBs placed strategically at various points in the network. Each separate ECB has its own rule database that is populated with all possible source nodes, types of packets, and appropriate destinations for each packet. The rule database can be populated by the network operator, or by the operators of the source/destination nodes. In one exemplary embodiment, the rule database is dynamically generated over time.

DETAILED DESCRIPTION OF THE INVENTION

The present invention discloses an architecture for optimally delivering raw data generated by network elements to relevant destinations. A Distributed Enterprise Collection Bus (DECB) receives raw data from two or more sources. This raw data includes event-related data such as Call Detail Records (CDRs), Accounting Requests (ACRs) within an IMS framework, or wrappers generated by two or more servers such as Application Servers relating to a subscriber's usage of the application. This raw data is delivered in packets. An orchestration unit within the enterprise collection bus correlates a packet of raw data to one or more destinations for the wrapper. These correlations may correspond to two or more rules stored in a rule database within the DECB. A particular raw data wrapper may be relevant for one destination but not relevant for another. A filtering unit discards packets having no appropriate destination. The present invention also includes a distribution unit to disseminate raw data wrappers to the appropriate destinations. These may include data warehouses, mediation systems, dynamic profiling systems, as well as other applications that will be evident to one skilled in the art.

Figure 1:
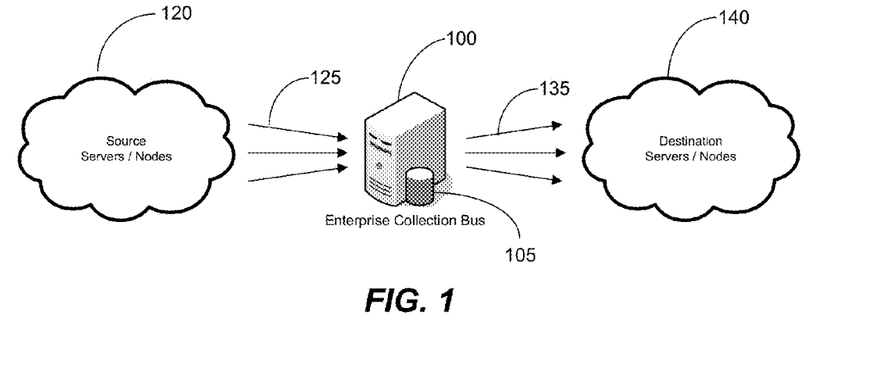
FIG. 1 shows a high-level view of an Enterprise Collection Bus on a network, according to an exemplary embodiment of the present invention.

FIG. 1 shows a general schematic of an enterprise collection bus on a network, according to an exemplary embodiment of the present invention. Source nodes/servers 120 are points on the network that generate raw data. This data could be useful to a number of destination servers/nodes 140 for a plethora of applications. The source data is sent 125 in packet form to a unit on the network called the Enterprise Collection Bus (ECB) 100. ECB 100 orchestrates and filters the packet of raw data. Orchestration involves parsing the file wrapper or header of the packet, determining the source and contents of the packet, and assigning one or more appropriate destinations for the packet. The step of determining an appropriate destination is facilitated by referring to a number of rules stored in a rule database 105 within ECB 100. A single packet may have more than one appropriate destination 140. Part of the orchestration process may involve grouping those packets that are earmarked for the same destination. The packets are then delivered 135 to their appropriate destination servers/nodes 140. The present invention thus alleviates the burden from the source and destination of sorting and filtering incoming packets of raw data.

Rule Database 105 is very helpful to the proper operation of ECB 100. Rule database 105 contains a reference of every source 120 that may deliver packets of raw data, types of packets of raw data, and appropriate destinations 140 for these packets. The orchestration unit within ECB 100 refers to these rules to determine where the packet of raw data needs to be addressed. An example of such a rule is that every Call Data Record (CDR) from every Mobile Switching Center (MSC) be delivered to a wiretap database as mandated by the Communications Assistance for Law Enforcement Act (CALEA). Thus, every CDR will be delivered to its appropriate destination, as well as to a CALEA data warehouse.

Rule database 105 may be updated by the network operator via a web interface or a software interface. Rule data may additionally be dynamically updated by operators of the destination servers/nodes, as they deem appropriate. For instance, a destination data warehouse may request to have raw data related to network congestion in Atlanta be sent to them. A rule would be implemented that delivers the raw data from the network monitoring tool (RMON or SNMP) to the destination data warehouse, thus adding the warehouse as an appropriate destination in the rule database. Other combinations will be apparent to one skilled in the art.

A key feature of the present invention is the ability to receive large quantities of diverse source data from multiple sources. This means that the collection unit within ECB 100 has to be Protocol Agnostic, which generally implies that ECB 100 is able to interface with a variety of existing network nodes 120. For instance, ECB 100 may be able to receive Call Detail Records (CDRs) from a switching center, in FTP format, while at the same time receiving Accounting Requests (ACRs) from a VoIP server in SIP or HTML format. Simultaneously, ECB 100 may receive real-time reports from a number of RMON or SNMP probes related to network conditions. Furthermore, ECB 100 may receive real-time data from Authentication, Authorization, and Accounting (AAA) systems from a security or Deep Packet Inspection (DPI) server. These data may be delivered via various protocols, including, for example, the RADIUS protocol, containing all information about call setup, IMEI, etc. and are delivered in real time, as opposed to actual CDRs that are a compiled record. Compatible protocols that may be used with the present invention include, but are not limited to: CDR, SS7, E-mail, WML, SOAP, HTTP, ASN1, RMON, SNMP, AAA, SIP, JMS, FTP, Diameter, DPI, WAP 1, WAP 2, WC3, GTP Prime, ACR. Other protocols are also possible and are apparent to one having ordinary skill in the art after consideration of the present description. One of ordinary skill in the art also has the knowledge necessary to make the present invention compatible with other protocols known, developed or anticipated in the art.

ECB 100 has the ability to receive all these packets, group them together based on the appropriate destination, and deliver the packets to the destination in a format that is friendly to the destination. First, this alleviates the burden on the source nodes to deliver their data to destinations using different protocols. No more will a Mobile Switching Center (MSC) have to deliver raw CDRs to four or five different types of servers for their own use. Just one copy of the CDR needs to be sent to ECB 100, which then finds the appropriate destination and delivers the CDR.

In another embodiment, the Enterprise Collection Bus additionally acts as a filter for unwanted raw data. A filtering unit within the ECB determines if data is unnecessary or duplicative, and discards those packets. For instance, Data that is unnecessary or duplicative is filtered out. An unwanted packet of raw data may come from many sources and may be unwanted by multiple destinations. A packet of data may be unwanted by almost every network element. For instance, a virus-infected media resource tagged as such by Deep Packet Inspection (DPI) would be generally undesirable to most servers on the network. Similarly, in an email system, a message tagged as spam by a spam filter may only be relevant to a spam database. These data packets may be discarded by the filtering unit if they have no relevant destination.

Figure 2:
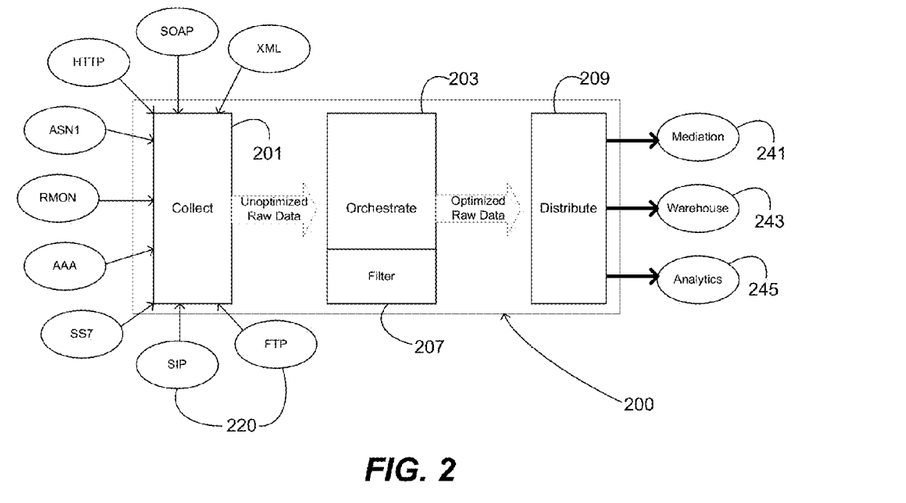
FIG. 2 shows in more detail the components of an Enterprise Collection Bus, according to an exemplary embodiment of the present invention

FIG. 2 shows in more detail the components of an Enterprise Collection Bus, according to an exemplary embodiment of the present invention. Within ECB 200, a protocol-agnostic collector 201 receives raw data from a number of sources 220. As indicated, this raw data comprises multiple formats generated by standard network nodes on a 3G or equivalent IP/telecommunications network, including but not limited to Web, Transport, Data, and other protocols. Collector 201 has a temporary storage unit (not shown) and sends the information to an orchestration unit 203. Orchestration unit 203 refers to rule database 105 (not shown) to determine appropriate destinations for each packet of data from the sources 220. In case no appropriate destination is found for the packet, orchestration unit 203 passes the packet to a filtering unit 207, which discards the packet. Similarly, duplicative packets may be filtered as well by filtering unit 207. The remaining packets are assigned to their appropriate addresses and delivered by a distributing unit 209. In one embodiment, packets of raw data are grouped by destination, thereby making the task of distributing unit 209 more effective and efficient. Distributing unit 209 delivers packets of raw data to a number of destinations, including data warehouses 243, data marts, network analytics servers 245, mediation 241, etc. Distributing unit 209 is able to communicate with these destination nodes and is again protocol agnostic, e.g., distributing unit 209 can send packets in most formats accepted by the particular destination node. In one embodiment, almost every destination node 241-245 has a unique SIP address and can communicate over an IP network such as the Internet.

The present invention thus assumes repetitive filtering and sorting tasks from the destination nodes, relieving resources of those nodes. For instance, a rule may be implemented that directs every incoming CDR from a specific switch to a particular mediation system or data warehouse. In the prior art, a collection or filtration system within the destination mediation system or data warehouse would sift through incoming CDRs and process only the relevant ones. However, the present invention relieves the destination system by directing only those relevant wrappers to the destination. This leaves destination nodes more resources to perform the tasks they were intended to perform.

Figure 3:
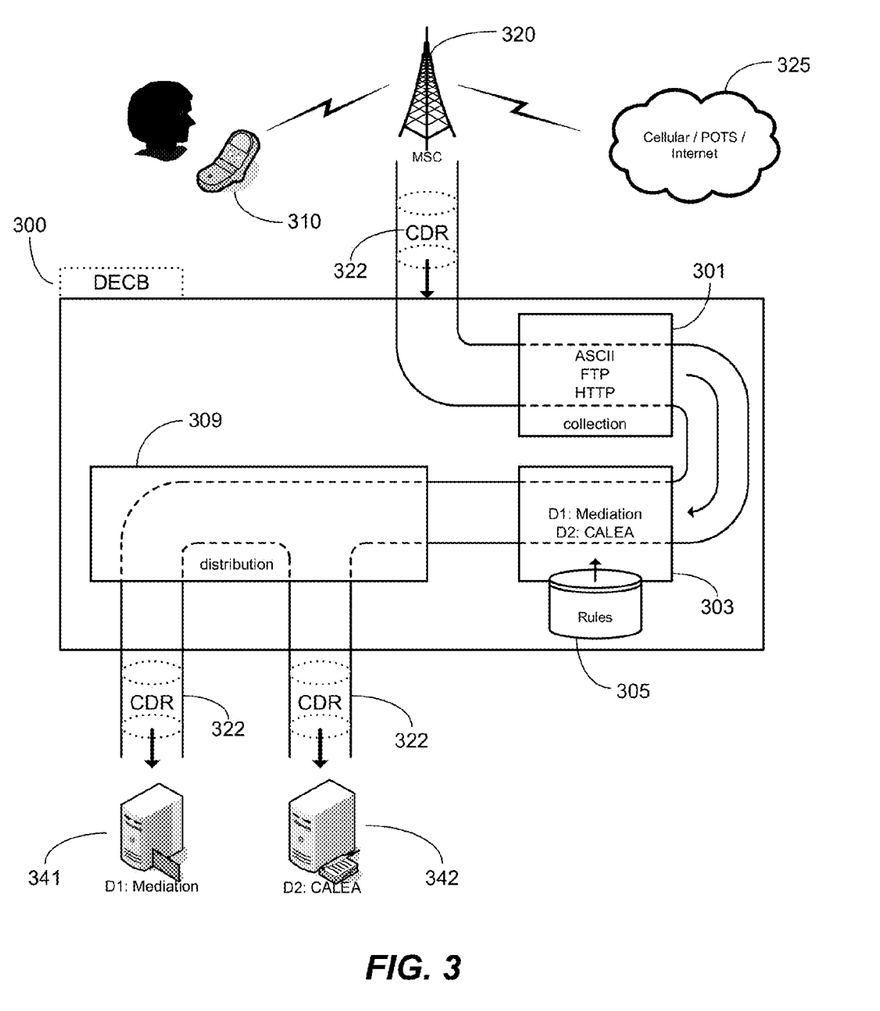
FIG. 3 shows an Enterprise Collection Bus receiving and delivering a packet of raw data, according to an exemplary embodiment of the present invention.

FIG. 3 shows an ECB receiving and delivering a packet of raw data, according to an exemplary embodiment of the present invention. A user device 310 is in wireless communication with a Mobile Switching Center (MSC) 320 via a radio tower. MSC 320 is in communication with a network 325 such as a phone network or an IP network such as the Internet. MSC 320 is also in communication with an ECB or Distributed ECB ("DECB") 300. The distributed aspect of the DECB 300 is described in FIG. 5). This embodiment shows the pipeline through which a packet of raw data, such as a CDR 322, is routed. DECB 300 comprises a collection unit 301, an orchestration unit 303, and a distribution unit 309. A rule database 305 is also present. Finally, two exemplary destinations in this example include a Mediation server 341 and a CALEA database 342.

When user device 310 accesses a particular service, such as making a phone call, MSC 320 processes the phone call and connects user device 310 to network 325. At the same time, MSC 320 is programmed to generate a Call Detail Record (CDR) 322 for the event. Where in the past MSC 320 would have to find a way to send CDR 322 to one or more destinations, the present invention incorporates DECB 300 to receive the CDR 322. Within DECB 300, Collection unit 301 is protocol agnostic and receives CDR 322 regardless of the format delivered. CDR 322 is typically a string of text arranged in ASCII, FTP, or HTTP format, all of which collection unit 301 is programmed to receive. Collection unit 301 routes the incoming CDR 322 to orchestration unit 303 that is coupled to rule database 305. Orchestration unit 303 looks at the wrapper of CDR 322, refers to rule database 305, and determines that there are two appropriate destinations for the CDR: D1 is a mediation server 341, and D2 is a CALEA database 342.

In one embodiment, even if CDR 322 has a different destination address in the header, orchestration unit 303 repopulates that field with the destination addresses in rules database 305. In this way, packets are only sent to appropriate destinations and not to those destinations that have not opted to receive the packet. In another embodiment, orchestration unit 303 appends rule database 305 with the original destination address, delivers the packet, and the destination/recipient node 341-342 has the option of updating rule database 305 to either remain an appropriate destination or to delete the entry. This way, rule database 305 is populated over time. More use of DECB 300 will increase efficiency over time.

Once orchestration unit 303 has assigned appropriate destination addresses, it passes CDR 322 on to distribution unit 309. Based on the number of appropriate destinations, orchestration unit 303 may submit multiple copies of CDR 322 to distribution unit 309 to be sent to the appropriate destinations. Alternatively, distribution unit 309 considers the appropriate destination addresses assigned by orchestration unit 303, and makes the required number of copies. Then, distribution unit 309 delivers the packet to the destinations. In this case, there are two destinations 341-342, so two separate copies of the same CDR 322 are delivered. Again, this should demonstrate how the present invention efficiently dispatches an optimal amount of raw data across the network, leaving the source and destination nodes with more resources to perform their intended tasks.

Figure 4:
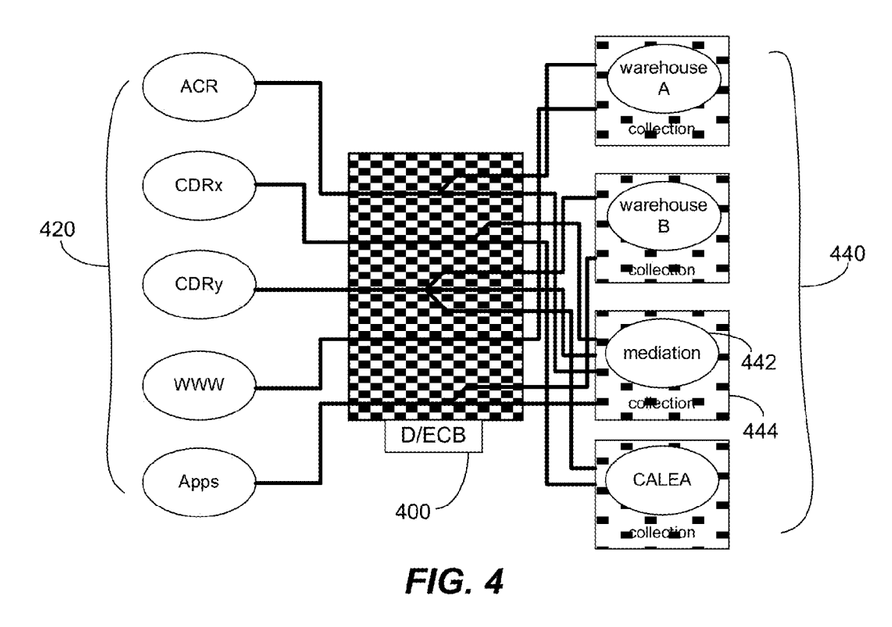
FIG. 4 shows a schematic of a network system employing an Enterprise Collection Bus to collect and disseminate raw data to various sources, according to an exemplary embodiment of the present invention.

The above concept can be applied to a larger scale with more widely varying sources and destinations. FIG. 4 shows a schematic of a network system employing an ECB, according to an exemplary embodiment of the present invention. A variety of source data 420 is delivered from network nodes to a DECB 400. This data includes ACRs, different CDRs from different sources (such as a SIP broker or regional MSCs), web usage statistics, and application usage statistics. All this is raw data that needs to be delivered to the back end for various purposes. Using the above method, DECB 400 efficiently routes the packets to the appropriate servers 440, avoiding duplicate packages and seamlessly integrating the information without having to deal with protocol incompatibilities, excessive gateways, etc. Destinations 440 that can use this data have their own collection mechanisms. These typically collect, sort, and filter incoming packets. For instance, a mediation system 442 would have a collecting unit 444 slightly similar to that of the collecting unit in DECB 400. However, instead of inundating mediation system 442 with a plethora of packets from different sources, a single DECB 400 delivers packets to mediation system 442 by receiving packets from a variety of sources and orchestrating delivery based on rules present in the rule database.

Since the present invention may be implemented in a large and complex network system, such as today's telecommunications networks, an important feature is that it is scaleable. In other words, a single Enterprise Collection Bus could be at the center of the network, but at the same time, multiple ECBs can be distributed at various points in the network. An ECB could be placed at the outer edge of a 3G or IMS network system, such that it is relegated to receiving raw data from usage of web services or applications, or external network probes. This ECB could, for instance, be in communication with a Deep Packet Inspection (DPI) node, forming an efficient packet filtration system. Other ECBs can be placed at various points in the network, alleviating network congestion by sorting and filtering different types of raw data packets sent across the network. Additionally, one could incorporate a redundant pair in every data center. Each ECB pair would act as the interface to all other network nodes, and would have separate sets of rules regarding how to disseminate and distribute the packets of raw data that are generated by the closest source nodes.

Figure 5:
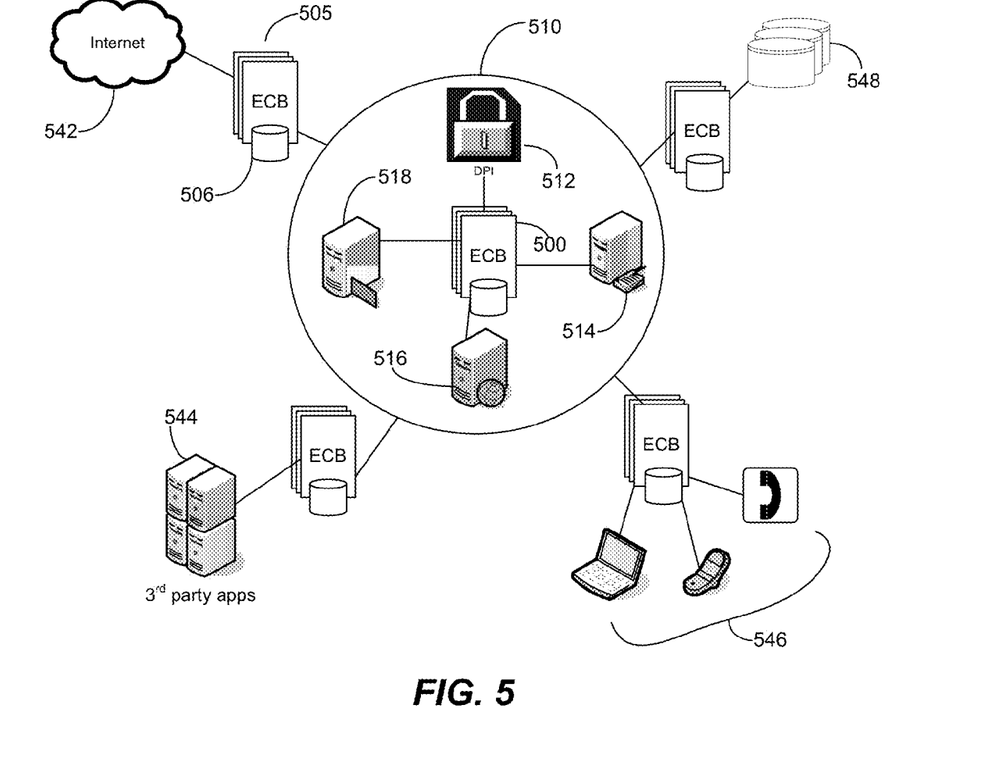
FIG. 5 shows a network system incorporating a Distributed Enterprise Collection Bus, according to an exemplary embodiment of the present invention.

This type of architecture can be referred to as a Distributed Enterprise Collection Bus (DECB). FIG. 5 shows a network incorporating a DECB, according to an exemplary embodiment of the present invention. A network operator operates a network system 510. While the network system 510 may include many network elements and nodes, only a few examples are shown. A deep packet inspection (DPI) server 512, a directory server 514, a media server 516, and a billing system 518 are examples of nodes that generate and collect raw data within network system 510. An ECB 500 also resides within network system 510 to collect raw data and disseminate the data appropriately, as described above. However, outside of network system 510 several other nodes exist on a larger network, said nodes being in communication with and exchanging information with network system 510. These include computers/servers over the Internet 542, third-party service providers 544, roaming users and/or archaic/alternative communications networks/devices 546, and external data warehouses or data marts 548 for network and other analytics. Deep packet inspection 512 is at selected areas in the network, for instance monitoring packets leaving network 510, or elsewhere in the IT infrastructure monitoring incoming information. Third-party applications 544 generally comprise applications provided by vendors in the network. Examples of third-party applications would include MobiTV, TeleNav, Motricity, RealTV, as well as credit card clearing brokers, gaming service providers, etc.

In the present embodiment, several ECBs 505 are placed strategically at points where information is shared with external nodes/servers. These are equipped with databases 506 containing rules related to the source nodes they are in communication with. Being protocol agnostic, distributed ECBs 505 ease the burden on external servers to send their raw data to servers within network 510. Additionally they reduce the total number of packets traversing the boundaries of network 510 by eliminating duplicate and unwanted packets.

Besides alleviating processing power and network congestion across several nodes and systems, incorporating a distributed enterprise collection bus has several benefits. For instance, third-party partner application server 544 submits settlement records, typically in real-time or as a batch of records at time periods. These settlement records detail the usage of a third-party application by a subscriber of network 510. In the past, network operators had only these records to rely on when it came to settling bills with the third-party provider. This was the only way to get revenue from accounting checking on the back end. With the incorporation of an ECB, however, the network operator can obtain real-time records from multiple sources that can be correlated with network usage, thereby being able to validate what the third-party provider is charging.

A further embodiment of the system uses a common management system for multiple ECBs. The common management system enables a central location for the rules database and orchestration unit. In this embodiment, the common management system allows for one location to contain a reference for every source that may deliver packets of raw data, types of packets of raw data, and appropriate destinations for these packets. A central orchestration unit refers to these rules to determine where each packet needs to be addressed.

In exemplary embodiments of the invention, each ECB contains a temporary storage unit between a Collection unit and Orchestration unit. In the event of a failure of one of the ECBs, the data remains stored in the temporary storage of that ECB. The data may then be sent to any of the other ECBs to be processed. In certain embodiments, this sending may be automated such that when one ECB fails the data is automatically sent to another ECB or a central ECB. This prevents loss of data during failure of one or more of the ECBs.

Several other applications can exploit this distributed enterprise collection bus. Systems like data warehousing are used by telecommunications operators to collect large quantities of customer information from different network sources built for mediation. Data warehousing is also used for device identification analytics, service solution analytics, network security for deep packet inspection, web portal access analytics, third-party settlement for charging, etc. Accounting analytics need raw CDRs to make sure accounting was properly managed. In a 3G architecture, mediation is handled by a Charging Gateway Function (CGF) that collects raw CDRs, correlates them with ACRs, and forms useful records for billing. Other applications use CDRs to get real-time device identities to populate an IMEI database (an IMEI is a unique ID for a GSM mobile device). The combination of device identities and call records can be used for many purposes, including Over the Air Programming (OTA), thus increasing the quality of service for a customer. Advertising layers for rich IP services require some historical information and some real-time information to provide these services optimally. This personalization database would be closer to the network getting records via SIP or other protocols.

Again, the present invention can bring together all these systems/databases, eliminating the databases from having to move information between themselves or do it in a limited fashion. All that is being done is observing the number of nodes that could send information, collecting the information in the DECB, and orchestrating it (put a rule to see where it needs to be distributed).

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A method comprising:
    receiving, at a server comprising a processor, a packet of raw data, wherein the packet of raw data is generated by a source server on a network and is related to an event, the packet of raw data comprising a header, the header further comprising a first destination address;
    discarding, by the processor, the packet of raw data upon a determination that the packet of raw data is not to be saved;
    consulting, by the processor, a rule database to determine a destination server for the packet of raw data, wherein the destination server is at a different address than the first destination address, and wherein the destination server comprises a communications assistance for law enforcement database and a mediation server;
    repopulating, by the processor, the header to replace the first destination address with the different address of the destination server; and
    distributing, by the processor, the packet of raw data to the destination server, wherein the event is a service activity of a service hosted by the source server on the network, wherein the packet of raw data is received by a collector unit that receives, from a plurality of separate sources, a call detail record from a switching server, an accounting request from a voice-over-IP server, a plurality of real-time reports relating to network conditions from a network condition probe, and a plurality of real-time reports from a deep packet inspection server, and wherein the packet of raw data comprises a record of usage of the service activity.

2. The method of claim 1, further comprising discarding the packet of raw data in the case that no destination server exists for the packet of raw data.

3. The method of claim 1, wherein the network is a mobile network.

4. The method of claim 1, wherein the packet of raw data is a call detail record, and wherein the source server is a switching center.

5. The method of claim 1, wherein the packet of raw data is generated and received in real time.

6. The method of claim 1, wherein the destination server comprises a billing system.

7. The method of claim 1, wherein the destination server comprises a data warehouse.

8. The method of claim 1, wherein the packet of raw data comprises a duplicative data packet.

9. The method of claim 1, wherein the packet of raw data comprises a virus-infected data packet.

10. The method of claim 1, wherein the packet of raw data comprises a spam data packet.

11. A system comprising:
    a processor; and
    a memory that stores instructions comprising a collecting unit, an orchestration unit, a distribution unit, and a rule database, wherein execution of the instructions by the processor causes the processor to perform operations comprising
        receiving, using the collecting unit, a packet of raw data comprising a header, the header further comprising a first destination address, wherein the collecting unit receives, from a plurality of separate sources, a call detail record from a switching server, an accounting request from a voice-over-IP server, a plurality of real-time reports relating to network conditions from a network condition probe, and a plurality of real-time reports from a deep packet inspection server,
        determining, using the orchestration unit, a destination server for the packet of raw data, the destination server being located at a different address than the first destination address, the destination server comprising a communications assistance for law enforcement database and a mediation server, and
        repopulating the header to replace the first destination address with the different address of the destination server,
    storing, using the rule database, a plurality of rules correlating a plurality of destination addresses on the network with the packet of raw data, and
    delivering, using the distribution unit, the packet of raw data to the destination server, the distribution unit further comprising a filtering unit that discards the packet of raw data upon a determination that the packet of raw data is one of a duplicative data packet, a virus-infected data packet, and a spam data packet, the filtering unit further discarding the packet of raw data in the case that no destination address exists in the rule database, wherein the raw data comprises a record of usage of a service.

12. The system of claim 11, wherein a plurality of collecting, orchestration, and distribution units along with the rule database form an enterprise collection bus, wherein the plurality provides redundancy.

13. The system of claim 12, wherein the enterprise collection bus is protocol agnostic, and can be situated at any point in the network.

14. The system of claim 13, wherein the enterprise collection bus is situated in a pair configuration comprising two enterprise collection buses.

15. An information collection system, comprising:
    a processor; and a memory that stores logic that, when executed by the processor, causes the processor to perform operations comprising
receiving a packet of raw data comprising a header, the header further comprising a first destination address,
receiving, from a plurality of separate sources, a call detail record from a switching server, an accounting request from a voice-over-IP server, a plurality of real-time reports relating to network conditions from a network condition probe, and a plurality of real-time reports from a deep packet inspection server,
determining a destination server for the packet of raw data, the destination server being at a different address than the first destination address, the destination server comprising a communications assistance for law enforcement database and a mediation server,
repopulating the header to replace the first destination address with the different address of the destination server,
discarding the packet of raw data upon a determination that the packet of raw data is one of a duplicative data packet, a virus-infected data packet, and a spam data packet, and
forwarding the packet of raw data to the destination server.

16. The information collection system of claim 15, wherein the operations further comprise the packet of raw data if no destination address exists for the packet of raw data.

17. The information collection system of claim 15, further comprising:
a plurality of rules stored on a first database; the plurality of rules being used to determine the different address.

18. The information collection system of claim 15, wherein the destination server is an application server.

19. The information collection system of claim 15, wherein the packet of raw data comprises a Call Detail Record.

20. The information collection system of claim 19, wherein the destination server is a switching center.

* * * * *